US009374560B2

(12) United States Patent
Day

(10) Patent No.: US 9,374,560 B2
(45) **Date of Patent: *Jun. 21, 2016**

(54) SYSTEMS AND METHODS FOR MANAGING A STATUS CHANGE OF A MULTIMEDIA ASSET IN MULTIMEDIA DELIVERY SYSTEMS

(75) Inventor: Thomas Day, Superior, CO (US)

(73) Assignee: Rovi Guides, Inc., San Carlos, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/487,518

(22) Filed: Jun. 4, 2012

(65) Prior Publication Data

US 2012/0240145 A1 Sep. 20, 2012

Related U.S. Application Data

(63) Continuation of application No. 11/324,201, filed on Dec. 29, 2005, now Pat. No. 8,214,869.

(51) Int. Cl.

| | |
|---|---|
| ***H04H 60/32*** | (2008.01) |
| ***H04N 7/173*** | (2011.01) |
| ***H04N 7/16*** | (2011.01) |
| ***H04N 21/432*** | (2011.01) |
| ***H04N 5/76*** | (2006.01) |

(Continued)

(52) U.S. Cl.

CPC ............. *H04N 7/17318* (2013.01); *H04N 5/76* (2013.01); *H04N 21/26283* (2013.01); *H04N 21/432* (2013.01); *H04N 21/4325* (2013.01); *H04N 21/47202* (2013.01); *H04N 21/4821* (2013.01); *H04N 21/4882* (2013.01)

(58) Field of Classification Search

USPC .................................... 725/14, 100, 133, 144

See application file for complete search history.

(56) References Cited

U.S. PATENT DOCUMENTS 4,264,924 A 4/1981 Freeman
4,264,925 A 4/1981 Freeman et al.

(Continued)

FOREIGN PATENT DOCUMENTS

EP 0 682 452 11/1995
EP 0721253 7/1996

(Continued)

OTHER PUBLICATIONS

"Electronic Program Guide Via Internet", Anonymous, Research Disclosure Bulletin, No. 385:276, May 1996, p. 276.

(Continued)

*Primary Examiner* — Pankaj Kumar
*Assistant Examiner* — Franklin Andramuno
(74) *Attorney, Agent, or Firm* — Ropes & Gray LLP

(57) ABSTRACT

Systems and methods are disclosed which detect a change in the status of a multimedia asset in a multimedia delivery system, and take steps to make the multimedia asset available after the status change. The multimedia asset can then be locally recorded on the user's digital video recorder (DVR) before the status changes. Alternatively, the user can be directed to an equivalent asset, for example, video-on-demand (VOD). The user may also receive a notification, which can be displayed on a TV or computer monitor or send to a remote device, for example to a mobile phone as an email or a short message. The user may be able to purchase the asset and/or initiate recording the asset. The status can be, for example, an expiration date of an asset, or a change of the source or format of an asset.

18 Claims, 6 Drawing Sheets

(51) Int. Cl.

| | |
|---|---|
| ***H04N 21/262*** | (2011.01) |
| ***H04N 21/472*** | (2011.01) |
| ***H04N 21/482*** | (2011.01) |
| ***H04N 21/488*** | (2011.01) |

(56) References Cited

U.S. PATENT DOCUMENTS 4,488,179 A 12/1984 Kruger
4,573,072 A 2/1986 Freeman
4,706,121 A 11/1987 Young
4,750,036 A 6/1988 Martinez
4,751,578 A 6/1988 Reiter et al.
4,841,132 A 6/1989 Kajitani et al.
4,847,696 A 7/1989 Matsumoto et al.
4,879,611 A 11/1989 Fukui et al.
4,908,707 A 3/1990 Kinghorn
4,908,713 A 3/1990 Levine
4,945,563 A 7/1990 Horton et al.
4,977,455 A 12/1990 Young
5,012,409 A 4/1991 Fletcher et al.
5,038,211 A 8/1991 Hallenbeck
5,047,867 A 9/1991 Strubbe et al.
5,068,733 A 11/1991 Bennett
5,151,789 A 9/1992 Young
5,187,589 A 2/1993 Kono et al.
5,195,134 A 3/1993 Inoue
5,210,611 A 5/1993 Yee et al.
5,223,924 A 6/1993 Strubbe
RE34,340 E 8/1993 Freeman
5,253,066 A 10/1993 Vogel
5,285,284 A 2/1994 Takashima et al.
5,293,357 A 3/1994 Hallenbeck
5,296,931 A 3/1994 Na
5,323,234 A 6/1994 Kawasaki
5,335,277 A 8/1994 Harvey et al.
5,351,075 A 9/1994 Herz et al.
5,353,121 A 10/1994 Young et al.
5,357,276 A 10/1994 Banker et al.
5,382,983 A 1/1995 Kwoh et al.
5,410,344 A 4/1995 Graves et al.
5,416,508 A 5/1995 Sakuma et al.
5,479,268 A 12/1995 Young et al.
5,485,219 A 1/1996 Woo
5,523,796 A 6/1996 Marshall et al.
5,532,754 A 7/1996 Young et al.
5,534,911 A 7/1996 Levitan
5,539,822 A 7/1996 Lett
5,550,576 A 8/1996 Klosterman
5,568,272 A 10/1996 Levine
5,576,755 A 11/1996 Davis et al.
5,583,560 A 12/1996 Florin et al.
5,585,838 A 12/1996 Lawler et al.
5,585,858 A 12/1996 Harper et al.
5,589,892 A 12/1996 Knee et al.
5,592,551 A 1/1997 Lett et al.
5,594,509 A 1/1997 Florin et al.
5,596,361 A 1/1997 Martinez
5,596,373 A 1/1997 White et al.
5,619,247 A 4/1997 Russo
5,629,733 A 5/1997 Youman et al.
5,631,995 A 5/1997 Weissensteiner et al.
5,632,007 A 5/1997 Freeman
5,635,978 A 6/1997 Alten et al.
5,635,989 A 6/1997 Rothmuller
5,640,484 A 6/1997 Mankovitz
5,657,414 A 8/1997 Lett et al.
5,684,525 A 11/1997 Klosterman
5,694,381 A 12/1997 Sako
5,699,107 A 12/1997 Lawler et al.
5,721,829 A 2/1998 Dunn et al.
5,724,091 A 3/1998 Freeman et al.
5,727,060 A 3/1998 Young
5,751,282 A 5/1998 Girard et al.
5,758,257 A 5/1998 Herz et al.
5,790,198 A 8/1998 Roop et al.
5,798,785 A 8/1998 Hendricks et al.
5,801,787 A 9/1998 Schein et al.
5,805,763 A 9/1998 Lawler et al.
5,808,608 A 9/1998 Young et al.
5,809,204 A 9/1998 Young et al.
5,812,123 A 9/1998 Rowe et al.
5,812,205 A 9/1998 Milnes et al.
5,812,763 A 9/1998 Teng
5,812,937 A 9/1998 Takahisa et al.
5,828,945 A 10/1998 Klosterman
5,850,218 A 12/1998 LaJoie et al.
5,880,768 A 3/1999 Lemmons et al.
5,883,677 A 3/1999 Hofmann
5,903,723 A 5/1999 Beck et al.
5,920,700 A 7/1999 Gordon et al.
5,940,572 A 8/1999 Balaban et al.
5,949,954 A 9/1999 Young et al.
5,959,688 A 9/1999 Schein et al.
5,969,748 A 10/1999 Casement et al.
5,974,222 A 10/1999 Yuen et al.
5,995,155 A 11/1999 Schindler et al.
6,002,394 A 12/1999 Schein et al.
6,020,930 A 2/2000 Legrand
6,058,242 A 5/2000 Kim
6,061,056 A 5/2000 Menard et al.
6,081,291 A 6/2000 Ludwig, Jr.
6,091,883 A 7/2000 Artigalas et al.
6,141,488 A 10/2000 Knudson et al.
6,154,771 A 11/2000 Rangan et al.
6,157,413 A 12/2000 Hanafee et al.
6,163,316 A 12/2000 Killian
6,177,931 B1 1/2001 Alexander et al.
6,185,360 B1 2/2001 Inoue et al.
6,208,799 B1 3/2001 Marsh et al.
6,233,389 B1 5/2001 Barton et al.
6,243,865 B1 6/2001 Wei et al.
6,247,176 B1 6/2001 Schein et al.
6,275,648 B1 8/2001 Knudson et al.
6,285,685 B1 9/2001 Bum
6,323,911 B1 11/2001 Schein et al.
6,324,338 B1 11/2001 Wood et al.
6,327,418 B1 12/2001 Barton et al.
6,341,374 B2 1/2002 Schein et al.
6,347,400 B1 2/2002 Ohkura et al.
6,348,932 B1 2/2002 Nishikawa et al.
6,388,714 B1 5/2002 Schein et al.
6,442,332 B1 8/2002 Knudson et al.
6,473,559 B1 10/2002 Knudson et al.
6,505,348 B1 1/2003 Knowles et al.
6,564,005 B1 5/2003 Berstis
6,611,958 B1 8/2003 Shintani et al.
6,630,954 B1 10/2003 Okada
6,681,396 B1 * 1/2004 Bates et al. .................... 725/58
6,701,527 B2 3/2004 Schein et al.
6,756,997 B1 6/2004 Ward, III et al.
6,760,538 B1 7/2004 Bumgardner et al.
6,771,886 B1 8/2004 Mendelsohn
6,850,693 B2 2/2005 Young et al.
6,973,663 B1 12/2005 Brown et al.
7,047,549 B2 5/2006 Schein et al.
7,088,910 B2 8/2006 Potrebic et al.
7,162,729 B2 1/2007 Schein et al.
7,330,693 B1 2/2008 Goss
7,543,320 B2 6/2009 Schein et al.
7,765,235 B2 7/2010 Day
7,774,816 B2 8/2010 Bumgardner et al.
7,992,163 B1 * 8/2011 Jerding et al. ................. 725/28
8,214,869 B2 7/2012 Day
2001/0028782 A1 10/2001 Ohno et al.
2002/0040475 A1 4/2002 Yap et al.
2002/0057893 A1 5/2002 Wood et al.
2002/0059621 A1 5/2002 Thomas et al.
2002/0116712 A1 8/2002 Schein et al.
2002/0144279 A1 10/2002 Zhou
2002/0169712 A1 11/2002 Ginzboorg et al.
2002/0174430 A1 11/2002 Ellis et al.
2002/0174433 A1 11/2002 Baumgartner et al.
2003/0009766 A1 1/2003 Marolda
2003/0033601 A1 2/2003 Sakata et al.

(56) References Cited

U.S. PATENT DOCUMENTS

| | | | | |
|---|---|---|---|---|
| 2003/0067554 | A1 | 4/2003 | Klarfeld et al. | |
| 2003/0118323 | A1 | 6/2003 | Ismail et al. | |
| 2003/0126607 | A1 | 7/2003 | Phillips et al. | |
| 2003/0149988 | A1 | 8/2003 | Ellis et al. | |
| 2003/0167471 | A1 | 9/2003 | Roth et al. | |
| 2003/0198462 | A1 | 10/2003 | Bumgardner et al. | |
| 2003/0206719 | A1 | 11/2003 | Bumgardner et al. | |
| 2003/0208763 | A1* | 11/2003 | McElhatten et al. | 725/58 |
| 2003/0217057 | A1 | 11/2003 | Kuroiwa et al. | |
| 2004/0049794 | A1 | 3/2004 | Shao et al. | |
| 2004/0091217 | A1 | 5/2004 | Nawae et al. | |
| 2004/0103434 | A1 | 5/2004 | Ellis et al. | |
| 2004/0111756 | A1 | 6/2004 | Stuckman et al. | |
| 2004/0117831 | A1 | 6/2004 | Ellis et al. | |
| 2004/0117845 | A1 | 6/2004 | Karaoguz et al. | |
| 2004/0125779 | A1 | 7/2004 | Kelton et al. | |
| 2004/0154040 | A1 | 8/2004 | Ellis | |
| 2004/0156614 | A1 | 8/2004 | Bumgardner et al. | |
| 2004/0181814 | A1 | 9/2004 | Ellis et al. | |
| 2004/0187150 | A1 | 9/2004 | Gonder et al. | |
| 2004/0210932 | A1 | 10/2004 | Mori et al. | |
| 2005/0015804 | A1 | 1/2005 | LaJoie et al. | |
| 2005/0050218 | A1 | 3/2005 | Sheldon et al. | |
| 2005/0055715 | A1 | 3/2005 | Minnick et al. | |
| 2005/0066353 | A1 | 3/2005 | Fransdnk | |
| 2005/0089022 | A1 | 4/2005 | Muhonen et al. | |
| 2005/0105528 | A1* | 5/2005 | Kobayashi | 370/390 |
| 2005/0138305 | A1* | 6/2005 | Zellner | 711/159 |
| 2005/0160461 | A1* | 7/2005 | Baumgartner et al. | 725/52 |
| 2005/0193015 | A1 | 9/2005 | Logston et al. | |
| 2005/0204388 | A1 | 9/2005 | Knudson et al. | |
| 2005/0213938 | A1* | 9/2005 | Ozawa et al. | 386/83 |
| 2005/0234992 | A1 | 10/2005 | Haberman | |
| 2005/0235323 | A1 | 10/2005 | Ellis et al. | |
| 2005/0238168 | A1 | 10/2005 | Lee et al. | |
| 2005/0240968 | A1 | 10/2005 | Knudson et al. | |
| 2005/0271363 | A1 | 12/2005 | Tanikawa | |
| 2005/0271364 | A1 | 12/2005 | Collar | |
| 2005/0271365 | A1 | 12/2005 | Hisatomi | |
| 2005/0271366 | A1 | 12/2005 | Wiinter et al. | |
| 2005/0273819 | A1 | 12/2005 | Knudson et al. | |
| 2006/0111038 | A1 | 5/2006 | Tatsumi et al. | |
| 2006/0140584 | A1 | 6/2006 | Ellis et al. | |
| 2006/0143665 | A1* | 6/2006 | Meek et al. | 725/88 |
| 2006/0174270 | A1 | 8/2006 | Westberg et al. | |
| 2007/0071399 | A1 | 3/2007 | Ellis | |
| 2007/0104456 | A1 | 5/2007 | Craner | |
| 2007/0107010 | A1 | 5/2007 | Jolna et al. | |
| 2008/0066016 | A1 | 3/2008 | Dowdy et al. | |
| 2008/0077957 | A1 | 3/2008 | Schein et al. | |
| 2008/0092168 | A1 | 4/2008 | Logan et al. | |
| 2010/0175090 | A1 | 7/2010 | Cordray | |

FOREIGN PATENT DOCUMENTS

| | | | |
|---|---|---|---|
| EP | 0 753 964 | | 1/1997 |
| EP | 0 836 320 | | 4/1998 |
| EP | 0 854 645 | | 7/1998 |
| EP | 1 187 467 | | 3/2002 |
| EP | 1 292 137 | | 3/2003 |
| EP | 1 355 489 | | 10/2003 |
| EP | 1 473 934 | | 11/2004 |
| EP | 1667455 | A1 | 6/2006 |
| GB | 2 210 526 | | 6/1989 |
| GB | 2 229 595 | | 9/1990 |
| JP | 63-054884 | | 3/1988 |
| JP | 63141467 | | 6/1988 |
| JP | 63-289619 | | 11/1988 |
| JP | 1212986 | | 8/1989 |
| JP | 01307944 | | 12/1989 |
| JP | 60-61935 | | 4/1994 |
| JP | 07-231437 | | 8/1995 |
| JP | 08-018882 | | 1/1996 |
| JP | 08-116495 | | 5/1996 |
| JP | 8-314979 | | 11/1996 |
| JP | 10-174037 | | 6/1998 |
| JP | 10247344 | | 9/1998 |
| JP | 11-136615 | | 5/1999 |
| JP | 11-313280 | | 11/1999 |
| JP | 01209399 | | 8/2001 |
| JP | 2002-335463 | | 11/2002 |
| JP | 2003-189267 | | 7/2003 |
| JP | 2003-304503 | | 10/2003 |
| JP | 2003-339000 | | 11/2003 |
| JP | 2004-07592 | | 1/2004 |
| JP | 2004-23326 | | 1/2004 |
| JP | 2004-120038 | | 4/2004 |
| JP | 2004-193920 | | 8/2004 |
| JP | 2004-320608 | A | 11/2004 |
| JP | 2004-343520 | | 12/2004 |
| JP | 2005-175519 | A | 6/2005 |
| JP | 2005-094175 | | 7/2005 |
| JP | 1078328 | | 5/2009 |
| JP | 2011-083034 | | 4/2011 |
| WO | WO 89/03085 | | 4/1989 |
| WO | WO 92/04801 | | 3/1992 |
| WO | WO 92/22983 | | 12/1992 |
| WO | WO 93/23957 | | 11/1993 |
| WO | WO-95/04431 | | 2/1995 |
| WO | WO 95/32583 | | 11/1995 |
| WO | WO 96/09721 | | 3/1996 |
| WO | WO 96/17473 | | 6/1996 |
| WO | WO 96/26605 | | 8/1996 |
| WO | WO 96/36172 | | 11/1996 |
| WO | WO 96/37075 | | 11/1996 |
| WO | WO-96/41478 | | 12/1996 |
| WO | WO 97/13368 | | 4/1997 |
| WO | WO 97/30546 | | 8/1997 |
| WO | WO-97/31306 | | 8/1997 |
| WO | WO 97/48230 | | 12/1997 |
| WO | WO-97/49242 | | 12/1997 |
| WO | WO 98/06219 | | 2/1998 |
| WO | WO 98/48566 | | 10/1998 |
| WO | WO 99/52279 | | 10/1999 |
| WO | WO 99/66725 | | 12/1999 |
| WO | WO 00/04706 | | 1/2000 |
| WO | WO 00/07368 | | 2/2000 |
| WO | WO 00/08852 | | 2/2000 |
| WO | WO 00/16548 | | 3/2000 |
| WO | WO 00/40026 | | 7/2000 |
| WO | WO 00/58833 | | 10/2000 |
| WO | WO 00/58967 | | 10/2000 |
| WO | WO 00/59214 | | 10/2000 |
| WO | WO 00/59223 | | 10/2000 |
| WO | WO 00/67475 | | 11/2000 |
| WO | WO 01/22729 | | 3/2001 |
| WO | WO 01/69929 | | 9/2001 |
| WO | WO 01/76239 | | 10/2001 |
| WO | WO 01/98920 | | 12/2001 |
| WO | WO-02069636 | A1 | 9/2002 |
| WO | WO 03/041410 | | 5/2003 |
| WO | WO-03043321 | A1 | 5/2003 |
| WO | WO 03/060157 | | 7/2003 |
| WO | WO 2004/002156 | | 12/2003 |
| WO | WO 2004/019602 | | 3/2004 |
| WO | WO 2004/040906 | | 5/2004 |
| WO | WO-2004/068841 | A2 | 8/2004 |
| WO | WO 2004/091217 | | 10/2004 |
| WO | WO 2005/002214 | | 1/2005 |
| WO | WO 2005/003921 | | 1/2005 |
| WO | WO-20050022913 | A1 | 3/2005 |
| WO | WO 2005/101188 | | 10/2005 |
| WO | WO 2006/060157 | | 6/2006 |
| WO | WO 2007/078739 | | 7/2007 |

OTHER PUBLICATIONS

Hofmann, J., "The Consumer Electronic Bus: An Integrated Multi-Media LAN for the Home," International Journal of Digital and Analog Communication Systems, vol. 4, No. 2, 1991, pp. 77-86.

"IS-60.3 Physical Layer and Medium Specifications. Part 3-CS Physical Layer & Medium Specification," CX Specification, Revised Mar. 19, 1992, Table of Contents (2 pp.) and pp. 1-41.

(56) References Cited

OTHER PUBLICATIONS

O'Brien, Jr., T.E., "Physical and Media Specifications of the CXBus," IEEE Transactions on Consumer Electronics, vol. 37, No. 3, Aug. 1991, pp. 357-366.
International Search Report for International Application No. PCT/US2006/047423 dated Jun. 21, 2007.
Sheth, A., C. Bertram and K. Shah (1999). "VideoAnywhere: A System for Searching and Managing Distributed Video Assets" SIGMOD Record 28(1): 104-109.
Non-Final Office Action dated Sep. 4, 2008 issued in U.S. Appl. No. 11/324,201.
Response dated Dec. 3, 2008 to Non-Final Office Action dated Sep. 4, 2008 issued in U.S. Appl. No. 11/324,201.
Non-Final Office Action dated Jan. 26, 2009 issued in U.S. Appl. No. 11/324,201.
Examiner Interview Summary Record dated Apr. 22, 2009 issued in U.S. Appl. No. 11/324,201.
Response dated May 21, 2009 to Non-Final Office Action dated Jan. 26, 2009 issued in U.S. Appl. No. 11/324,2021.
Non-Final Office Action dated Sep. 1, 2009 issued in U.S. Appl. No. 11/324,201.
Response dated Nov. 3, 2009 to Non-Final Office Action dated Sep. 1, 2009 issued in U.S. Appl. No. 11/324,201.
Final Office Action issued dated Feb. 18, 2010 in U.S. Appl. No. 11/324,201.
Request for Continued Examiner dated Apr. 19, 2010, in U.S. Appl. No. 11/324,201.
Davidson, Ken, "CEBus: A New Standard in Home Automation" Circuit Cellar Ink, pp. 40-52 (1989).
Goldberg, "A 35-inch Zenith TV premieres StarSight's onscreeen guide," Video (Apr. 1995) pp. 41.
Partial European Search Report dated Apr. 3, 2012 in EP Application No. EP 10 16 8916.4.
Extended European Search Report dated Aug. 9, 2012 in EP Application No. 10 16 8916 dated Aug. 9, 2012.
"Digital Video Broadcasting (DVB); DVB specification for data broadcasting", European Telecommunications Standards Institute, Draft EN 301 192 V1.2.1 (Feb. 1999).
Declaration of Rosetta Rogers Under 37 CFR 1.131 in U.S. Appl. No. 09/393,955.

* cited by examiner

SYSTEMS AND METHODS FOR MANAGING A STATUS CHANGE OF A MULTIMEDIA ASSET IN MULTIMEDIA DELIVERY SYSTEMS

CROSS REFERENCE TO RELATED APPLICATIONS

This application is a continuation of U.S. patent application Ser. No. 11/324,201, filed Dec. 29, 2005 now U.S. Pat. No. 8,214,869, which is hereby incorporated by reference herein in its entirety.

BACKGROUND OF THE INVENTION

This invention relates to managing delivery of multimedia assets to a user, before a status of these assets in a multimedia delivery system changes. More particularly, this invention relates to systems and methods for notifying a user of a status change of an asset and/or locally recording the asset before the status of the asset changes or the asset becomes unavailable from a provider of the asset.

Content delivery networks (e.g., cable, satellite, Internet) have been developed that can deliver various multimedia assets from a remote source to a user's equipment for viewing or interaction. Multimedia assets include live broadcast programs, web casts, Pay-per-View (PPV) events, and/or VOD content. Sometimes, a user may select multimedia assets to be recorded locally on the user's equipment, for example, on a VCR or digital video recorder (DVR). A live broadcast is typically viewed and/or recorded at the scheduled time set by the broadcast station, whereas VOD content can be viewed and recorded at any user-specified time prior to the expiration time of the VOD content. PPV programs also have expiration dates and may be viewed and/or recorded before the expiration times/dates of the asset from the source server.

Recording a multimedia asset requires a tuner associated with the user equipment to be tuned to the channel in which the multimedia asset is available. Recording an additional multimedia asset at the same time on the same device could require an additional tuner. If the device does not have an additional tuner, the user may have to forgo recording the additional multimedia asset.

The status of multimedia assets may change from time to time. For example, broadcast programs may migrate to VOD or web casts, or PPV content may migrate to VOD. For example, HBO may remove an asset from their regular scheduled broadcast lineup, but continue to make the content available on VOD for an additional amount of time. Another status change may be a change in the expiration time/date of an asset. Expiration date/time for an asset is typically listed in an interactive multimedia guidance application, such as an interactive program guide (IPG). The user may not always be aware of a status change that may prevent the user from viewing and/or recording the asset. Present systems, however, lack an integrated approach to monitor the status of a multimedia asset and to timely notify users of a status change that may impact them.

SUMMARY OF THE INVENTION

Problems in the prior art are addressed, in accordance with the principles of the present invention, by a method and apparatus in a video-on-demand (VOD) system for determining when the status of a selected multimedia asset changes.

In one embodiment, the invention is a method and apparatus for notifying a user of a status change of a multimedia asset. The invention involves selecting a multimedia asset and monitoring the status of the asset during a notification period which can be set by the user. The user may be notified if the status changes before a notification period expires.

In one embodiment, the multimedia asset may be locally recorded before a status change. Recording may be initiated by the user or automatically scheduled by the system. In one or more of these embodiments, the status change may be monitored automatically by an interactive multimedia guidance application, which may also prompt the apparatus to automatically record the asset. The user may also be notified by a message displayed on a television monitor, a computer monitor, a mobile phone, a PDA, or the like.

In some of the above embodiments, the asset may become available from a different source. The asset may then not need to be locally recorded, but the user may still be notified of the change.

In some embodiments, the user may have already viewed at least a portion of the selected multimedia asset before being notified of a status change, in which case only a remaining portion of the selected asset may be locally recorded before the status change.

In some of the above embodiments, the recording capacity of the local recording device may be checked before a multimedia asset is recorded. Only if the recording capacity is sufficient for recording the multimedia asset will the asset be recorded. If sufficient recording capacity is not available, deletion criterion may be applied to identify stored content that may be deleted from the local recording device.

Other aspect of the invention are directed to a method and apparatus for reconciling scheduling conflicts when locally recording a plurality of multimedia assets on a local recording device.

BRIEF DESCRIPTION OF THE DRAWINGS

The above and other features of the present invention, its nature and various advantages will be more apparent upon consideration of the following detailed description, taken in conjunction with the accompanying drawings in which.

DETAILED DESCRIPTION

The disclosed systems and methods are directed to taking action when the status of a multimedia asset is scheduled to change, and to optionally locally record the multimedia asset before the status change takes effect. The status may be monitored by an interactive multimedia guidance application, such as an interactive program guide (IPG).

Figure 1:
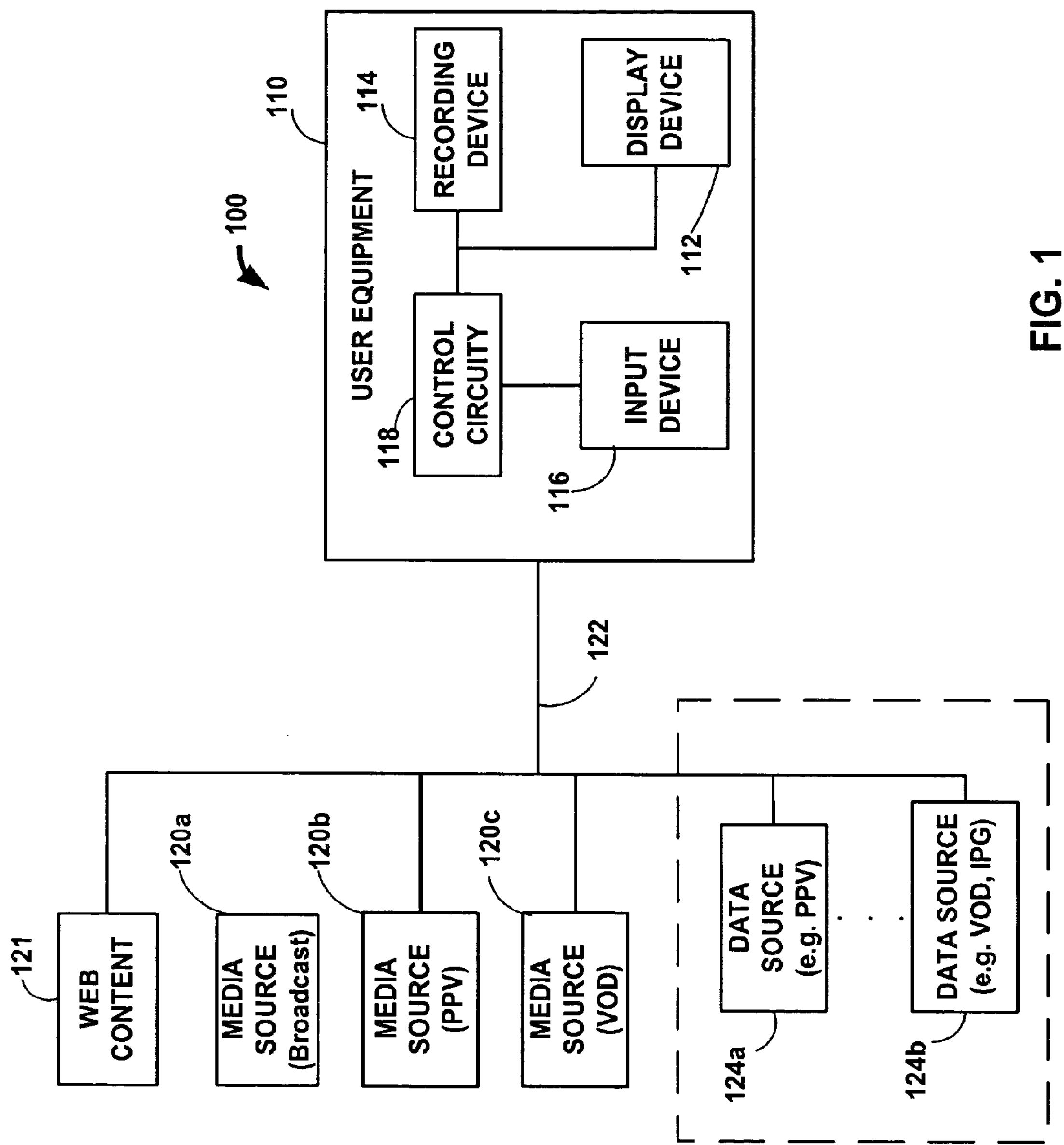
FIG. 1 is a block diagram of a system providing multimedia assets in accordance with one embodiment of the present invention.

FIG. 1 shows illustrative interactive multimedia delivery system 100 in accordance with one embodiment of the invention. User equipment 110 receives content in the form of signals from multimedia sources 120*a*, 120*b*, 120*c* over communications path 122. In practice there may be multiple multimedia sources 120*a*, 120*b*, 120*c* and user equipment 110, but only three multimedia sources and one user equipment are shown in FIG. 1 to avoid over-complicating the drawing.

Multimedia sources 120*a*, 120*b*, 120*c* may be any suitable media source such as, for example, a cable system headend, a satellite multimedia distribution facility, a multimedia broadcast facility, a pay-per-view (PPV) server, a game service provider (e.g., for online gaming), or any other suitable facility or system for originating or distributing content. Multimedia source 120*c* is depicted as an on-demand server (e.g., VOD server). Multimedia sources 120*a*, 120*b*, 120*c* may be configured to transmit signals over any suitable communications path 122 including, for example, a satellite path, a fiber-optic path, a cable path, an Internet path, or any other suitable wired or wireless path. The signals may carry any suitable content such as, for example, television programs, games, music, news, web services, or any other suitable content. In some embodiments, multimedia sources 120*a*, 120*b*, 120*c* may include control circuitry for executing the instructions of an interactive multimedia guidance application such as, for example, the server side instructions of a client/server or online interactive multimedia guidance application.

User equipment 110 may include any equipment suitable for providing an interactive multimedia experience. User equipment 110 may include television equipment such as a television, set-top box, recording device, video player, user input device (e.g., remote control, keyboard, mouse, touch pad, touch screen and/or voice recognition interface), or any other device suitable for providing an interactive multimedia experience. For example, user equipment 110 may include a DCT 2000, 2500, 5100, 6208 or 6412 set-top box provided by Motorola, Inc. In some embodiments, user equipment 110 may include computer equipment, such as a personal computer with a television card (PCTV). In some embodiments, user equipment 110 may include a gaming system, a portable electronic device, such as a portable DVD player, a portable gaming device, a cellular telephone, a PDA, a music player (e.g., MP3 player), or any other suitable portable or fixed. device.

In the example of FIG. 1, user equipment 110 includes at least control circuitry 118, display device 112, recording device 114 and user input device 116, which may be implemented as separate devices or as a combination device or devices. An interactive multimedia guidance application, such as an interactive program guide (IPG), may be implemented on user equipment 110 to display, on display device 112, the content transmitted by multimedia sources 120*a*, 120*b*, 120*c* over path 122 and to provide interactive multimedia guidance application features, such as a grid listing of available assets. In addition, Web content 121, such as streamed audio and video, may be transmitted to the user equipment 110, for example, over the Internet.

Display device 112 may be any suitable device such as, for example, a television monitor, a computer monitor, or a display incorporated in user equipment 110 (e.g., a cellular telephone or music player display). Display device 112 may also be configured to provide for the output of audio.

Control circuitry 118 is adapted to receive user input from input device 116 and execute the instructions of the interactive multimedia guidance application. Control circuitry 118 may include one or more tuners (e.g., analog or digital tuners), encoders and decoders, processors (e.g., Motorola 68000 family processors), memory (e.g., RAM and hard disks), communications circuitry (e.g., cable modem circuitry), input/output circuitry (e.g., graphics circuitry), connections to the various devices of user equipment 110, and any other suitable component for providing analog or digital multimedia programming, program recording, and interactive multimedia guidance features. In some embodiments, control circuitry 118 may be included as part of one of the devices of user equipment 110 such as, for example, part of display 112 or any other device (e.g., a set-top box, television and video player).

In some embodiments, the interactive multimedia guidance application may provide features to the user with a client/server approach. There may be one server for each instance of user equipment 110, one for multiple instances of user equipment 110, or a single server may serve as a proxy for each instance of user equipment 110.

Any suitable number of users may have equipment, such as user equipment 110, connected to multimedia sources 120*a*, 120*b*, 120*c* and one or more data sources 124*a*, 124*b*. But for the clarity of the figure, the equipment of only a single user is shown. The equipment of the plurality of users may be connected to media sources 120*a*, 120*b*, 120*c*, web content 121, and data sources 124*a*, 124*b* using a cable television network, a local area network (LAN), a wireless network, or any other suitable means, or a combination thereof. In some embodiments, the equipment of the plurality of users may be connected to each other using any suitable means.

User equipment 110 may receive interactive multimedia guidance application data from one or more data sources 124*a*, 124*b*. Data sources 124*a*, 124*b* may provide data for a particular type of content or for a particular application. For example, one data source 124*a* may provide data for non-on-demand assets (e.g., non-pay and pay-per-view programs), and another data source 124*b* may provide data for on-demand assets (e.g., VOD programs). Or, for example, a single data source may provide both of these types of data. For example, one of the data sources 124*b* or an additional data source (not shown) may also provide data for an interactive program guide (IPG). Another of the data sources 124*a*, 124*b* or a separate data source (not shown) may provide, for example, data for another interactive application (e.g., a home shopping application). In some embodiments, data sources 124*a*, 124*b* or additional data source (not shown) may provide data to the interactive multimedia guidance application using a client/server approach. There may be one server per data source, one for all sources or, in some embodiments, a single server may communicate as a proxy between user equipment 110 and various data sources 124*a*, 124*b*. In some embodiments, data sources 124*a*, 124*b* may provide data as an online interactive multimedia guidance application. In such embodiments, data sources 124*a*, 124*b* may include control circuitry for executing the instructions of the online multimedia guidance application.

FIG. 1 shows media sources 120*a*, 120*b*, 120*c* and data sources 124*a*, 124*b* as separate elements. In practice, their functionality may be combined and provided from a single system at a single facility, or multiple systems at multiple facilities. For example, one media source 120*b* and data source 124*b* may be combined to provide VOD content and associated VOD data.

In one embodiment, the interactive multimedia guidance application may be a stand-alone application implemented in a set-top box which may be part of user equipment 110. An interactive program guide may be downloaded periodically, for example, every day or once a week, from a data source, such as data source 124*a*, 124*b* and the application operates based on the downloaded programming information until the next update.

In another embodiment, the interactive multimedia guidance application may be a client/server application, with the server represented, for example, by a server on the cable headend, and the client by the user equipment 110, a personal computer, a mobile telephone, a PDA, and the like. In this scenario, the client polls the server for updates of programming information.

The interactive multimedia guidance application can also be implemented as a web browser capable of accessing a web site containing programming information and possibly multimedia assets.

For the purposes of clarity, the following discussion may sometimes describe an embodiment in which the interactive multimedia guidance application is an interactive program guide (IPG). It will be understood, however, that the following discussion and the features discussed may be applied to any interactive multimedia guidance application. The following discussion may occasionally also describe certain embodiments as being responsive to an expiration date. However, it should be understood that the embodiments may react to any change in status of the multimedia asset, such as a change in the media source providing the multimedia asset, a change in an availability time window of the multimedia asset, a change in a format of the multimedia asset, and the like.

The following flow charts serve to illustrate methods implemented in some embodiments of this invention. Though the examples focus on content that is alternatively available via a VOD server delivery mechanism, the invention is equivalently applicable to content that is alternatively available via PPV channels or Internet delivery mechanisms. Though the invention applies broadly to multimedia assets, as described earlier to include video/audio programs, interactive content, games, and applications; the following example is provided with respect to video/audio assets for clarity.

Figure 2:
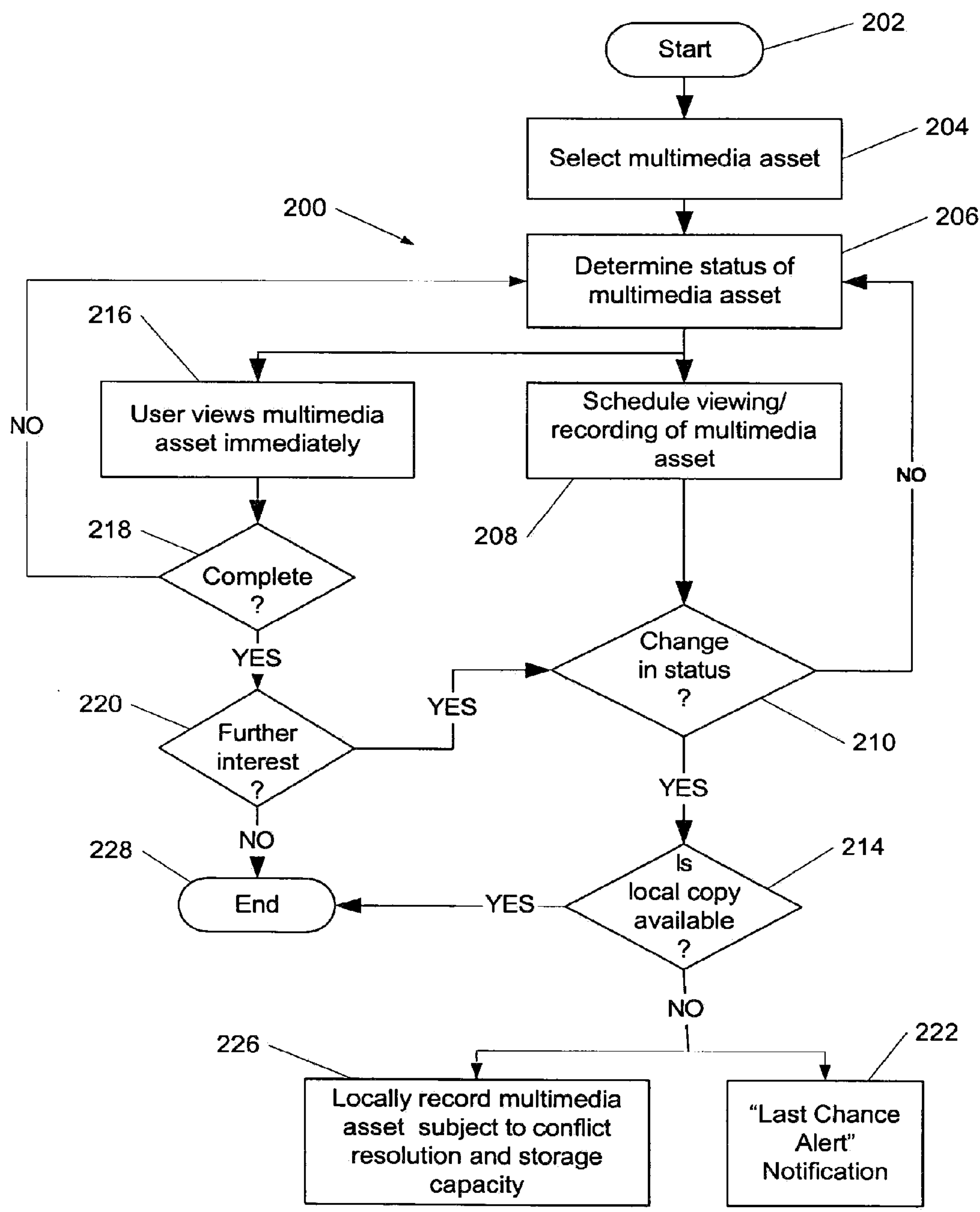
FIG. 2 is a flow chart of an illustrative process for scheduling local recording of a multimedia asset in accordance with one embodiment of the present invention.

FIG. 2 is a flow chart of an illustrative process 200 for locally recording a multimedia asset, before the asset becomes unavailable. Process 200 begins at step 202. At step 204, a user may select a multimedia asset, such as a broadcast program, VOD content or a PPV program. Alternatively or in addition, the system may also select a multimedia asset without user input based, for example, on the user's viewing history, a user profile, or agents programmed with user preferences, all of which may interact with the interactive multimedia guidance application.

At step 206, the interactive multimedia guidance application will check a status of the multimedia asset at the source server, such as a time window during which the asset remains available for viewing. At step 206, the interactive multimedia guidance application may determine, for example, a time when the asset will become available as VOD content. The user may select viewing/recording options on a graphic user interface (GUI). In one embodiment, the user may view the multimedia asset immediately, and process 200 moves to step 216. Alternatively, if the user schedules viewing and/or recording the multimedia asset for a later time, process 200 may move to step 208.

At step 216, if the user views the VOD content immediately, the system monitors at step 218 if the user views the entire content. If the system determines at step 218 that the user has finished viewing the multimedia asset, the system then determines, at step 220, if the user has further interest in the asset, for example, if the user has listed the asset under "Favorites." If at step 220 no further interest from the user is detected, then process 200 ends at step 228. The asset will still be accessible to the user unless a status change takes effect that makes in the asset inaccessible. However, the system may stop monitoring the status of the asset at the source server. On the other hand, if the system determines at step 218 that the user has not finished viewing the multimedia asset, at step 210, process 200 will move to step 206, where the system continues to monitor the status of the asset at the source server.

If at step 220, it is determined that the user has continued interest in the multimedia asset, process 200 moves to step 210 to check if a change in the status of the multimedia asset is impending. Likewise, the process moves from step 208, where the user had scheduled the multimedia asset for future viewing/recording, to step 210 to check for an impending status change. If no change in the status is detected at step 210, process 200 will move to step 206 and continue to determine the status of the multimedia asset. Conversely, at step 210, if a change in the status is detected indicating, for example, that the asset will be moved to another channel or source, or will have an earlier expiration date at the source than the original expiration date, then process 200 moves to step 214 to check if the asset has already been locally recorded. If a local copy of the asset is available, no further action is taken, and process 200 ends at step 228.

Conversely, at step 214, if it is determined that the asset has not been locally recorded, process 200 moves to step 226 and/or step 222 (depending on the implementation) to automatically alert the user of an impending change in status, for example, by displaying a "Last Chance Notification" (LCN) and/or to automatically record the multimedia asset locally before the status change takes effect. The LCN would thus enable a user to view and/or record an asset or at least a part of the asset ahead of the status change. Local recording may be subject to availability of sufficient storage capacity on recording device 114 and the resolution of scheduling conflicts with other scheduled recordings. A different alert notification "Now available on VOD" or the like could be displayed if the asset becomes available from another source; so that local recording of the asset may not be necessary or may at least be postponed.

Figure 3:
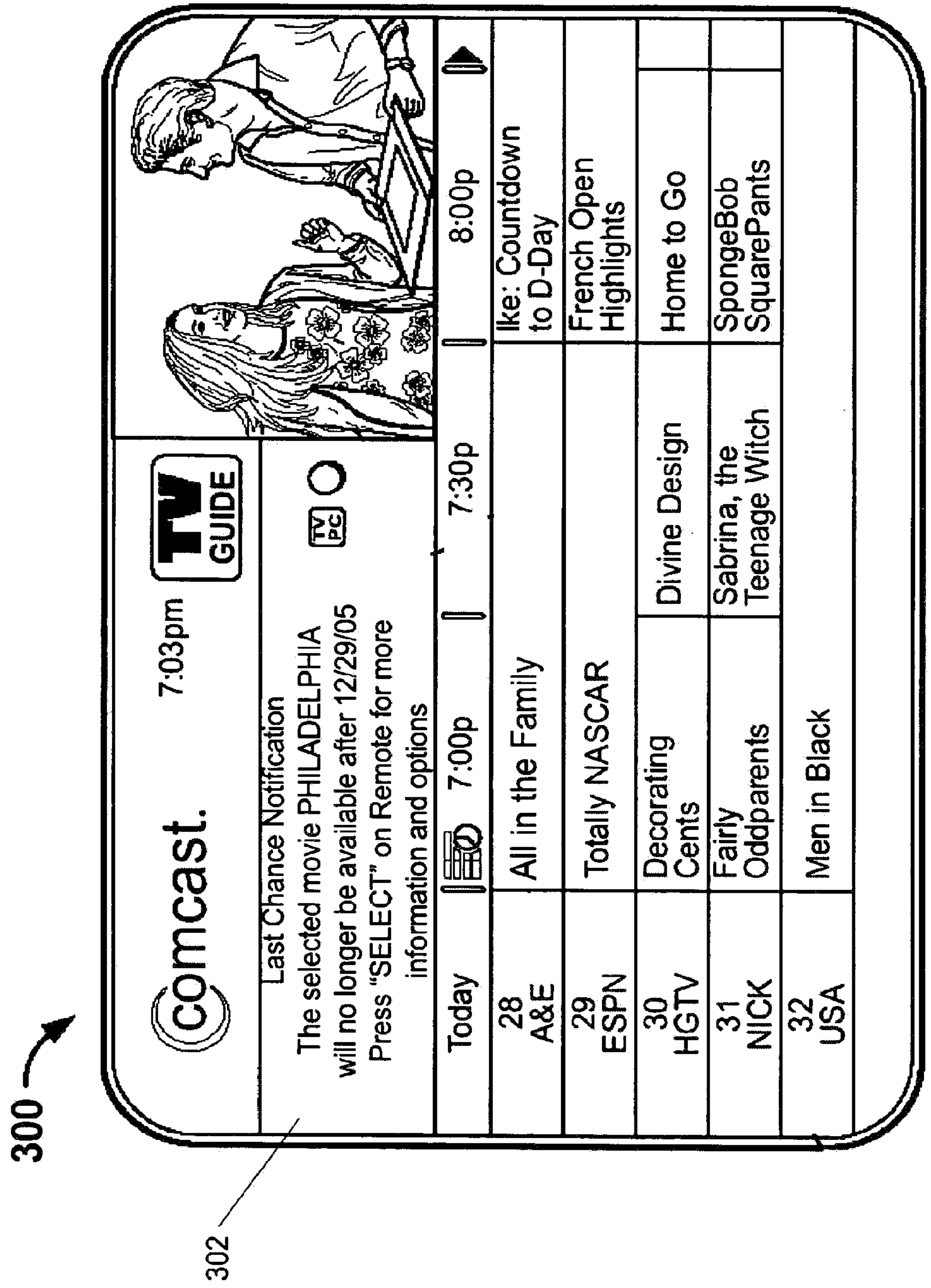
FIG. 3 shows schematically a screen display of a "Last Chance" notification.

FIG. 3 shows schematically an exemplary "Last Chance" notification window 302 displayed on a TV monitor or computer screen 300. The exemplary message displayed in notification window 302 informs the user that the movie "Philadelphia" will no longer be available from the original source after Dec. 29, 2005. The user may receive more information and/or may be directed to an alternative source for the asset, such as an alternative VOD or PPV channel, by pressing the SELECT" key on the remote control. Note that the asset listing in the illustrated interactive multimedia guidance application may be rearranged to display more than one notification, such as a list with notifications for assets changing status within the notification period. The notification window may also include active features (not shown) to enable a user to purchase the asset and/or to locally record the asset from the original source before the status of the asset on the source server changes.

Note that in various embodiments, notification 302 might be a notification that this is the "last chance" in the next 3 months to see a particular episode of a series (e.g. "Please note that this is the last time Movie X is going to be broadcast, or going to be on a premium channel, for the next 3 months"). This is relevant in a world where not everything is available on-demand on a server. In order to make this happen, in one implementation, the interactive media guidance application might first search a local-listings database to see when the program might air in the future. Such local databases are typically limited to two or three weeks of future program listings data. Therefore, in other implementations, the application may interact with more extensive remote databases that contained listings and schedules for further out in the future (e.g. the next 3 months).

Additionally, other notification types and other options associated with notifications are possible in addition to the one illustrated by FIG. 3. For example, in the context of a last chance notification related to the expiration of an episode of the Sopranos on HBO, a user might be prompted to (1) record the program locally or (2) buy the entire season's worth of episodes on DVD, the latter potentially through a click through billing interface to a third-party on-line retailer such as Amazon.com.

Other variants and options for the last chance notification include marketing tie-ins for program related purchases, such as a recipe book from Barnes and Nobel, whose recipes were featured on a food channel program that is about to expire, or peer-to-peer tie-ins such as a hot button to jump off to a discussion group related to the soon to expire program.

Figure 4:
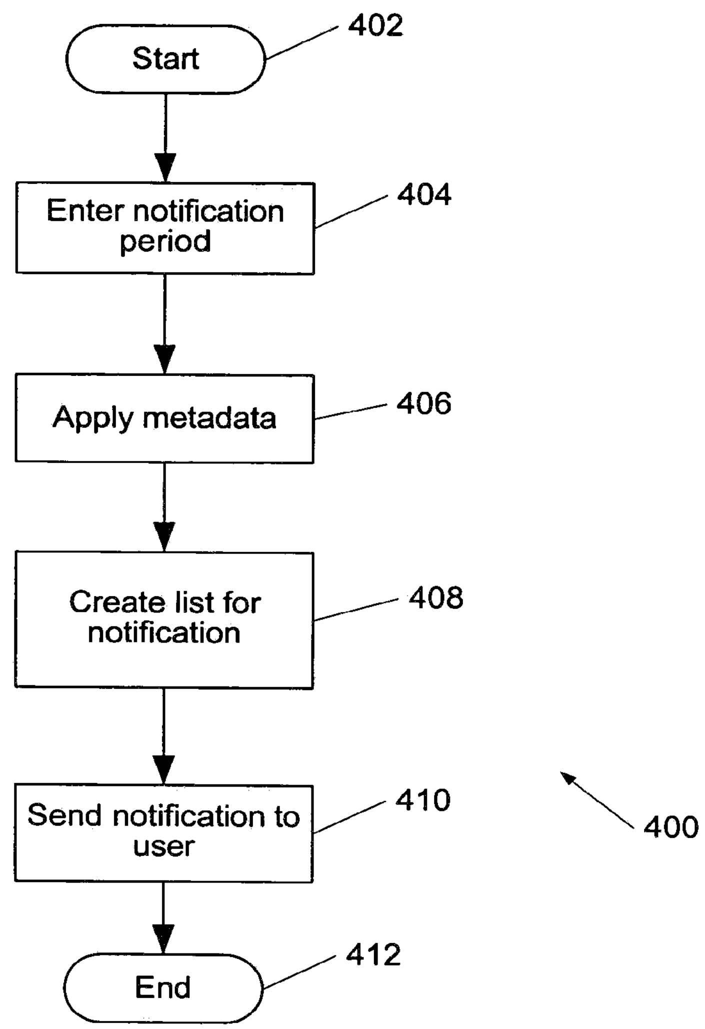
FIG. 4 is a flow chart of an illustrative process for setting a notification window in accordance with one embodiment of the present invention.

FIG. 4 is a flow chart of an illustrative process 400 for setting an alert period during which the user would be notified of a status change. The process 400 starts at step 402. At step 404, a user would enter an alert period specifying a time during which the user wishes to be notified of a status change. Since the user is likely to be interested in only a subset of the available assets, at step 406, the system applies certain metadata terms to narrow the number of assets included in the notification. The metadata to be applied can be entered by the user or can be automatically generated by the system based, for example, on user preferences and/or viewing habits. Metadata may include, for example, search strings or search masks applied to listings in the interactive media guidance application and may include times/dates when a program is broadcast or available from another source (such as VOD or PPV), program genres, titles, actors, and other information available from the interactive media guidance application or remote databases accessible to the interactive media guide application. For example, a particular user may only be interested in notifications for comedy programming. The combination of steps 404 and 406 can be referred to as "setup." At step 408, the system creates a shorter list based on the metadata terms in the setup, and monitors the status of the multimedia assets on the list (e.g., by requesting program data from an interactive media guidance application). At step 410, the system sends a notification to the user for each asset identified in the shorter list. The notification could be displayed on display device 112; alternatively or in addition, an email notification or a text message, for example using short message service (SMS), or the like could be sent to a mobile phone, PDA, or a similar device. This may even allow the user to set recording time for locally recording the asset, to view the asset, or to purchase the asset, if not already done so. The process 400 ends at step 412.

Figure 5:
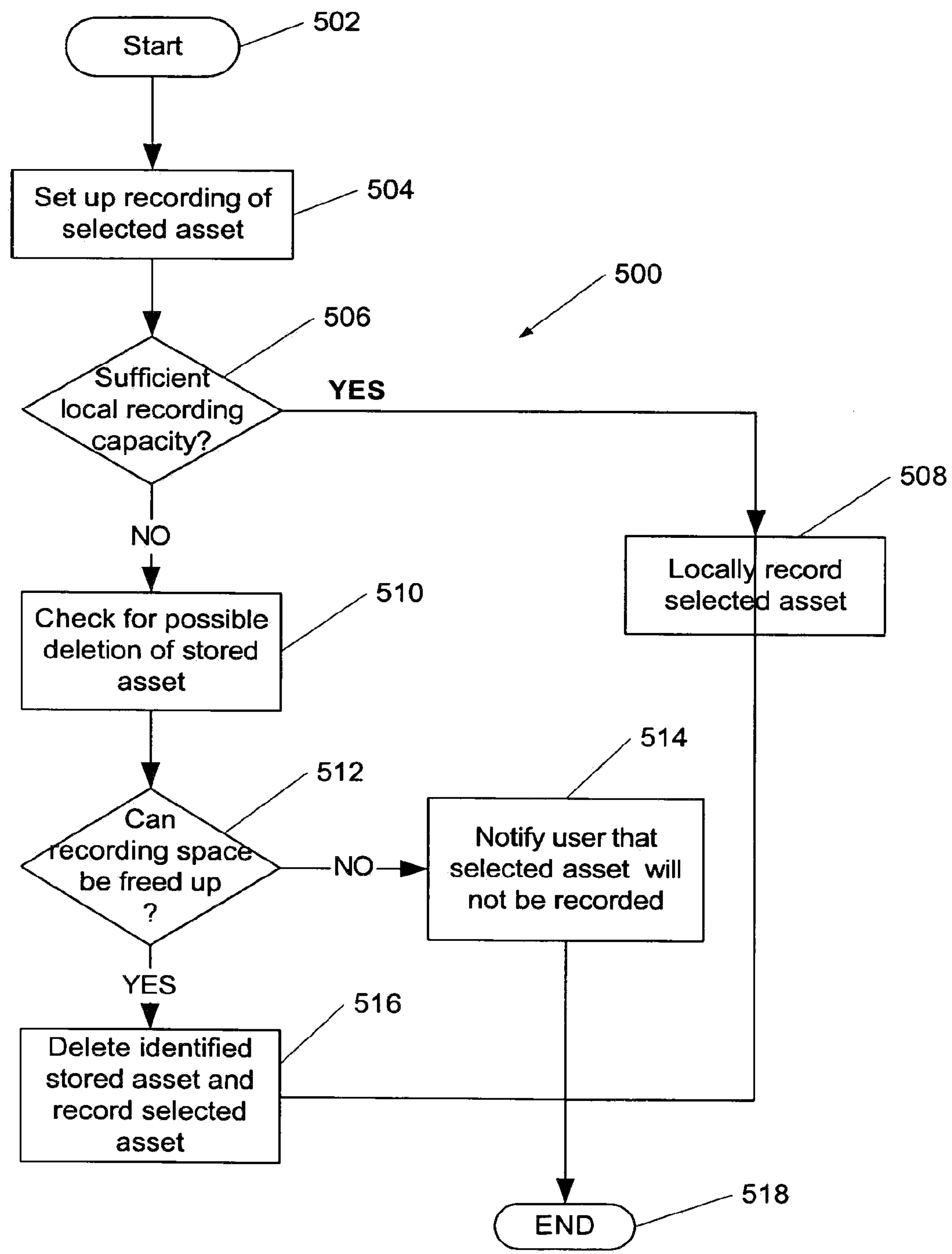
FIG. 5 is a flow chart of an illustrative process for managing local recording capacity for recording a multimedia asset in accordance with one embodiment of the present invention.

FIG. 5 is a flow chart of an illustrative process 500 for determining whether the local storage space is adequate for recording a selected asset. Process 500 begins at step 502. At step 504, process 500 sets up a local recording session for the multimedia asset by first checking the available recording capacity. At step 506, if it is determined that storage capacity is adequate, process 500 moves to step 508 to locally record the asset. The process ends at step 518.

Conversely, at step 506 if it is determined that the recording capacity is insufficient to record the asset, process 500 will check, at step 510, if other stored assets can be deleted. Criteria for deleting stored assets may include dynamic factors. Some examples of factors that are considered (whether dynamic or not) and criteria with respect to those factors include designation of stored assets as "archived" (which assets would be less likely to be deleted), when the assets were last viewed, direct and indirect input from the user with regard to the assets, and/or how frequently the user has accessed the stored assets. Assets targeted for deletion may include stored VOD assets or other recorded assets (e.g., pay-per-view or broadcast recorded assets). A recorded asset may also be deleted if the interactive multimedia guidance application indicates that the recorded asset will be available from an alternative source in the future.

At step 512, if the system determines that recording space can be made available by removing obsolete or deprioritized assets, process 500 moves to step 516 and deletes one or more identified obsolete assets and records the selected multimedia asset. Conversely, at step 512, if sufficient recording space can not be provided, process 500 moves to step 514 to notify the user that the selected multimedia asset cannot be recorded, unless the user manually deletes one or more stored assets to make recording space available. Process 500 ends at step 518.

Figure 6:
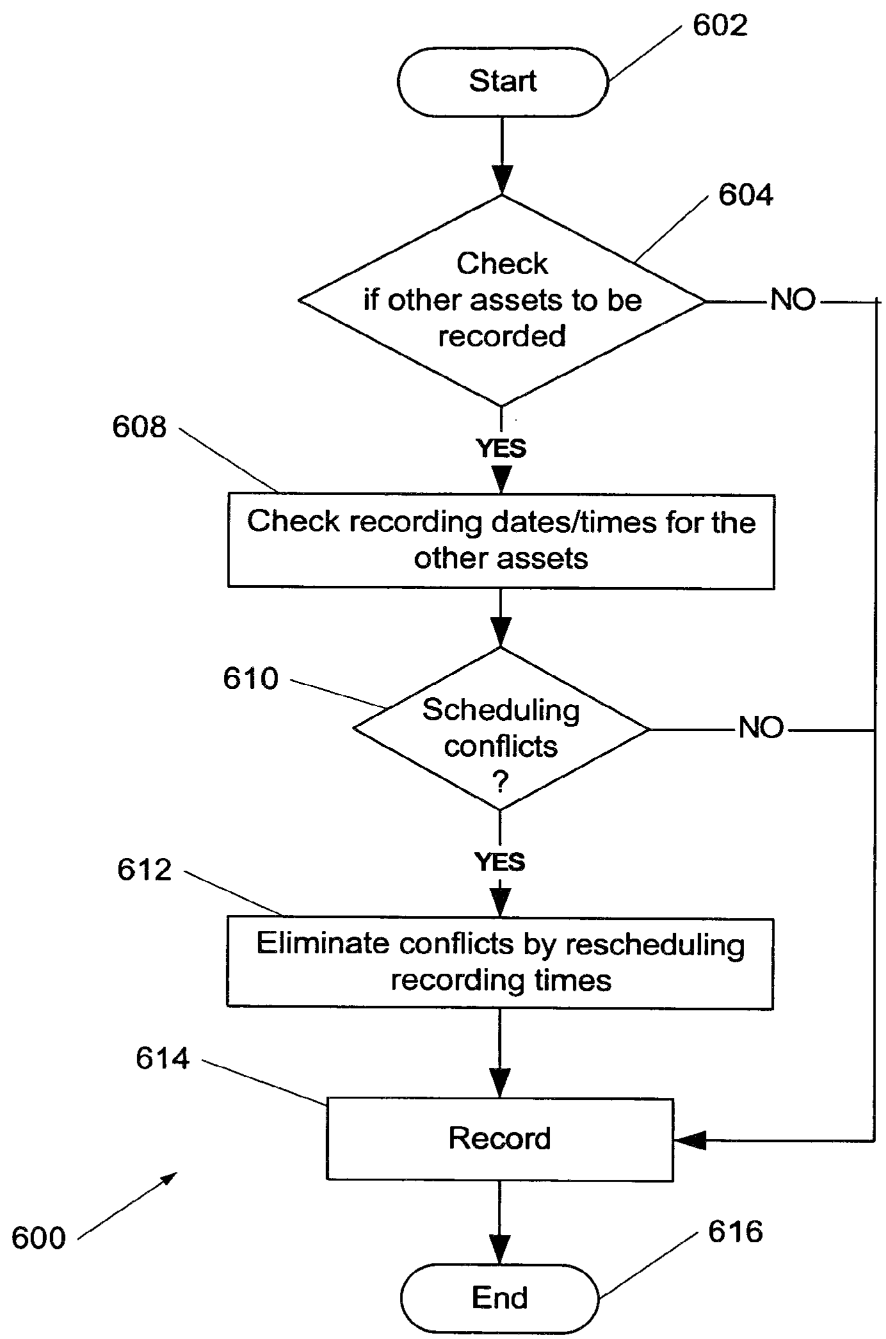
FIG. 6 is a flow chart of an illustrative process for preventing scheduling conflicts when recording multimedia assets.

FIG. 6 is a flow chart of an illustrative process 600 for resolving conflicts when two or more different multimedia assets are scheduled to be recorded locally. Process 600 starts at step 602. At step 604, the system checks if other assets in addition to an identified asset are scheduled to be recorded locally. If no other assets are scheduled and thus no scheduling conflicts exist, process 600 goes to step 614 to locally record the selected multimedia asset and process 600 ends at, step 616.

Conversely, at step 604, if it is determined that other multimedia assets are scheduled for local recording, process 600 moves to step 608 and checks the scheduled recording times/dates for the other assets. At step 610, if it is determined that the scheduled recording time for the various multimedia assets are not in conflict with each other, process 600 moves to step 614 and the multimedia assets are recorded at their scheduled times. Conversely, at step 610, if it is determined that a scheduling conflict exists, then process 600 moves to step 612 to attempt to change the recording time(s) so as to eliminate the conflict. If the system is able to resolve the conflict, the multimedia assets are recorded at the changed time(s) at step 614. Process 600 ends at step 616. If the conflict cannot be resolved, the user may be notified and asked to intervene.

Note that the multimedia assets may be distribution controlled, in which case recording and copying of the multimedia assets may be restricted. For example, a "broadcast" flag may be set in the asset to indicate that the content can not be copied. Alternatively, a "never copy" flag may be set, or a "play once" flag may be reset in digital rights management protocols such as IEEE 1394 5C. More information on IEEE 1394 5C can be found in "Digital Transmission Content Protection Specification Revision 1.4 (Informational Version)," Feb. 28, 2005, available from Digital Transmission Licensing Administrator (DTLA), 225 B Cochrane Circle, Morgan Hill, Calif. 95037 (USA), which is incorporated herein by reference in its entirety. It should be understood that certain embodiments of the present invention will include steps of checking and considering, in various implementation algorithms, the implications of such distribution and copy protections as well as security, encryption, and access control considerations.

The above described embodiments of the present invention are presented for purposes of illustration and not of limitation, and the present invention is limited only by the claims which follow.

What is claimed is:

1. A method for monitoring a status of a media asset, the method comprising:

determining, using a control circuitry, that a user has begun viewing the media asset and that the user has not finished viewing the media asset, wherein the media asset has not been selected for recording by the user;

in response to the determining, detecting, using the control circuitry, an upcoming change in status of the media asset;

determining, using the control circuitry, that the media asset has not been locally recorded; and in response to the detecting and determining that the media asset has not been locally recorded, alerting, using the control circuitry, a user of the upcoming change in status, wherein alerting the user comprises enabling the user to view or record at least part of the media asset which is not locally recorded before the status changes.

2. The method of claim 1, wherein alerting the user further comprises notifying the user of a last chance to record the media asset locally before the upcoming status change takes effect.

3. The method of claim 1, further comprising notifying the user that the media asset is available from an alternate source.

4. The method of claim 1, wherein alerting the user further comprises indicating a last available date for the media asset.

5. The method of claim 1, further comprising:

receiving a user selection of the media asset in response to alerting the user; and providing additional information for the media asset to the user.

6. The method of claim 1, wherein alerting the user comprises providing a list of media assets changing status within a notification period.

7. The method of claim 1, further comprising notifying the user of a last chance to view the media asset for a set period of time.

8. The method of claim 1, further comprising enabling the user to purchase the media asset.

9. A system for monitoring status of a media asset, the system comprising:

a storage device; and control circuitry configured to:

determine that a user has begun viewing the media asset and that the user has not finished viewing the media asset, wherein the media asset has not been selected for recording by the user;

detect, in response to the determining, an upcoming change in status of the media asset;

determine that the media asset has not been locally recorded on the storage device; and alert a user, in response to the detecting and determining that the media asset has not been locally recorded, of the upcoming change in status, wherein the means for alerting the user comprises means for enabling the user to view or record at least part of the media asset which is not locally recorded before the status changes.

10. The system of claim 9, wherein the control circuitry is further configured to notify the user of a last chance to record the media asset locally before the status change takes effect.

11. The system of claim 9, wherein the control circuitry is further configured to notify the user that the media asset is available from an alternate source.

12. The system of claim 9 wherein the control circuitry is further configured to indicate an upcoming last available date for the media asset.

13. The system of claim 9, wherein the control circuitry is further configured to:

receive a user selection of the media asset in response to alerting the user; and provide additional information for the media asset to the user.

14. The system of claim 9, wherein the control circuitry is further configured to provide a list of media assets for which status is changing within a notification period.

15. The system of claim 9, wherein the control circuitry is further configured to notify the user of a last chance to view the media asset for a period of time.

16. The system of claim 9, wherein the control circuitry is further configured to enable the user to purchase the media asset.

17. The method of claim 1, further comprising:

determining, using the control circuitry that the media asset matches pre-defined criteria.

18. The system of claim 9, wherein the control circuitry is further configured to:

determine that the media asset matches pre-defined criteria.

* * * * *